Patented Sept. 5, 1933

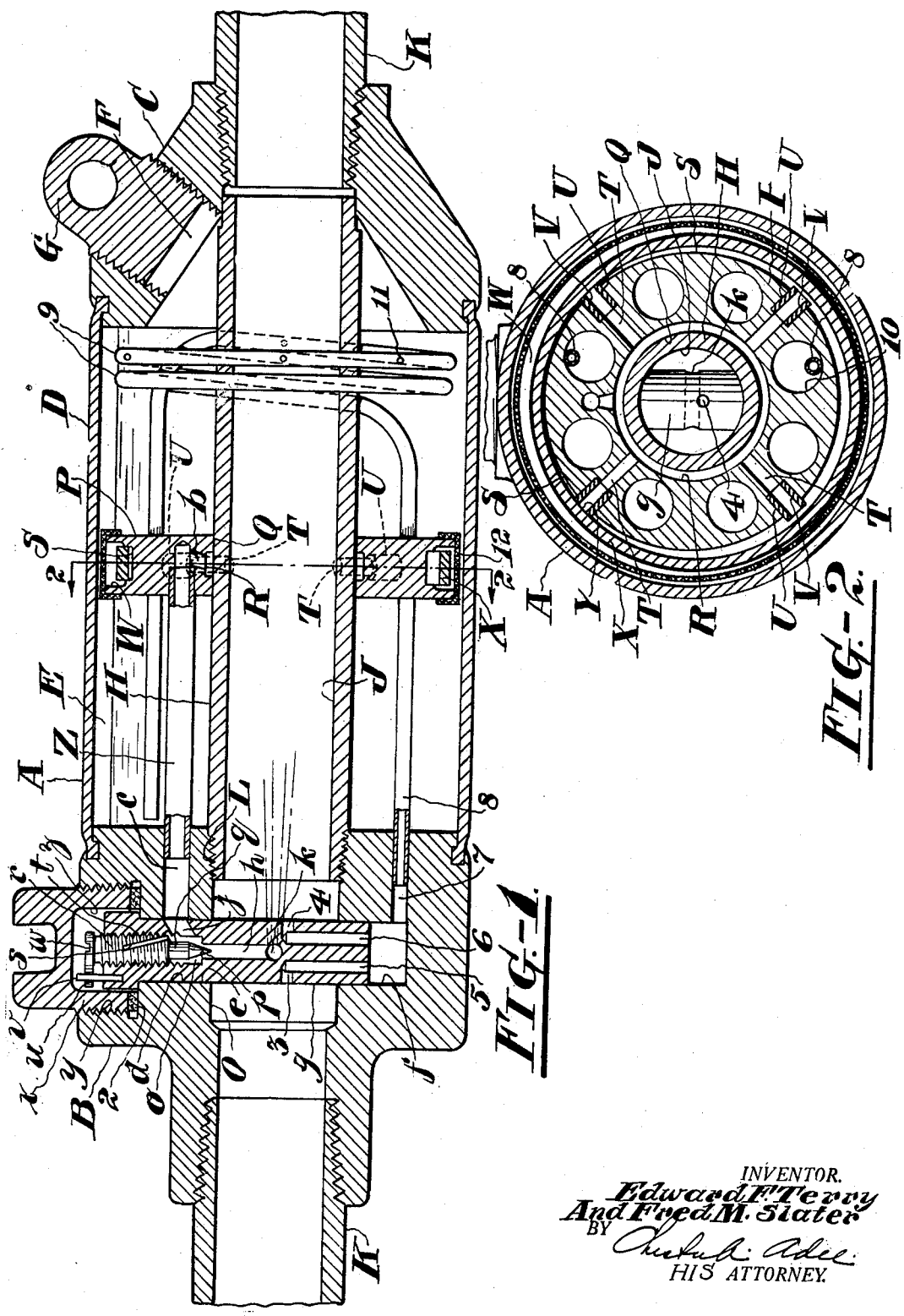

1,925,826

UNITED STATES PATENT OFFICE 1,925,826

LUBRICATOR

Edward F. Terry, Phillipsburg, N. J., and Fred M. Slater, Easton, Pa., assignors to Ingersoll-Rand Company, Jersey City, N. J., a corporation of New Jersey Application May 28, 1931. Serial No. 540,558

3 Claims. (Cl. 184—55)

This invention relates to lubricators, but more particularly to lubricators adapted to be attached to a supply line used for conveying pressure fluid to rock drills and other fluid actuated mechanisms.

One object of the invention is to assure an adequate supply of lubricant in a suitable state of atomization to the mechanism intended to be lubricated, and another object is to assure these favorable conditions in any position which the lubricator may occupy in practice.

Other objects will be in part obvious and in part pointed out hereinafter.

In the accompanying drawing illustrating the invention and in which similar reference characters refer to similar parts, Figure 1 is a longitudinal sectional elevation of an oiler constructed in accordance with the practice of the invention, and Figure 2 is a transverse view taken through Figure 1 on the line 2—2 looking in the direction indicated by the arrows.

Referring more particularly to the drawing, A designates generally the casing of the lubricator comprising end heads B and C and an intermediate tubular portion D connected to the heads B and C and the interior of which forms a reservoir E for lubricant. The lubricant, such as oil, may be introduced into the reservoir E through an opening F normally sealed by a filler plug G.

Extending longitudinally through the reservoir E and preferably coaxially thereof is a tubular member or pipe H, the interior bore of which serves as a main passageway J for pressure fluid and is a continuation or portion of a pressure fluid supply line, members K of which are herein shown as being threaded to the heads B and C. Preferably, the pipe H has one end disposed slidably in the head C and the opposite end of said pipe may be conveniently threaded, as at L, into the end of a bore O in the head B. The pipe H is thus held in the correct position with respect to the casing parts of the lubricator and in this manner also is effected an adequate seal to avoid the direct flow of pressure fluid from the passageway J or associated passages into the reservoir E.

The means whereby the lubricant is conveyed from the reservoir E comprises in this instance a plate P of circular form disposed within the reservoir E intermediate the ends thereof and has a bore Q to receive the pipe H to which the plate P may be affixed as by press fitting or otherwise. In diameter the plate P is preferably only slightly smaller than the reservoir E so that its periphery extends closely adjacent the inner surface of the portion D of the casing.

The plate P is provided with inner and outer annular grooves R and S respectively which communicate with each other through a plurality of radial passages T in the plate P, four being shown in this instance. Preferably the outer ends U of the passages T are enlarged to receive bushings V which form continuations of the passages T and of which the outer ends may, as shown, extend slightly beyond the bottom of the groove S.

In the periphery of the plate P is an enlarged groove W which acts as a guide for a ring valve X which is of somewhat larger diameter than the groove S wherein it may seat to form a closure for the inlet openings Y of the passages T. The ring X lies in the same transverse plane as the passages T and is loosely slidable in the grooves W and S so that as the lubricator A is shifted about from one position to another during the course of the work, it may readily adjust its position to assure seating thereof upon the projecting ends of the upwardly extending bushings V.

With the ring X thus closing the topmost passages T, lubricant will be drawn through the lowermost passage or passages T into the annular groove R. In order to convey such lubricant to the main passageway J to intermingle with the pressure fluid flowing therethrough the lubricator is provided with a tube Z which seats with one end in the plate P and communicates with the annular groove R through a passage b. The opposite end of the tube Z is seated in a passage c in the head B and which passage opens into a bore d extending transversely through the head B and having portions e and f lying on opposite sides of the bore O in the head B.

Disposed within the portions e and f of the bore D, and therefore extending transversely through the bore O, is a nozzle member g which may be affixed in the bore d in any suitable manner and has a longitudinal passage h which communicates with the passage c through a port j, also in the nozzle member g. The passage h is preferably of such length that when the nozzle member g is in assembled position in the head B the lowermost extremity of said passage terminates approximately in the plane of the longitudinal axis of the passageway J wherewith it communicates through a passage k extending transversely through the nozzle member g and opening into the passageway J on opposite sides of the nozzle member g.

The restricted portion of the passage h lies adjacent the passage k and the outer portion o of the passage h adjacent the port j is somewhat enlarged to form a valve seat p for a needle valve q threaded into the outer end of the nozzle member g for controlling the area of communication between the passage k and the port j. In order to assure the retention of the needle valve q in any position to which it may be adjusted in practice the threaded end r of the said valve is provided with a diagonal slot s to form a wing t which may be initially bent outwardly at its free end so that it will bind against the threads in the nozzle member g. In this way the needle valve q will be held in any position to which it may be adjusted and its position will not therefore be disturbed by any jars to which the lubricator A may be subjected.

The needle valve q is, however preferably capable of only a limited degree of adjustment so that the said valve may not be unscrewed from the nozzle member g or be unduly pressed against the seat p. To this end the said needle valve is provided with a lateral wing u which is adapted to seat against a pin v disposed in the outer end of the nozzle member g and extending into the path of the wing u. The needle valve q may also be provided with a slot w for the reception of a screw driver whereby the needle valve may be rotated for adjustment.

In order to protect the outer end of the needle valve against injury which might otherwise result from contact with the surface over which the lubricator may be moved, a plug x is threaded into an aperture y at the outer end of the portion e of the bore d. The plug x has a recess z to receive the adjacent end of the nozzle members g and the needle valve q and is preferably seated upon a gasket 2 disposed in the bottom of the recess y to prevent leakage of pressure fluid from the bore d to the atmosphere.

The means whereby pressure fluid is conveyed into the reservoir E to assure a constant pressure on the lubricant therein comprises a pair of passages 3 and 4 in the nozzle member g and preferably lying in the same transverse plane. The passages 3 and 4, which open into opposite sides of the nozzle member g and lie in the direction of air flow through the passageway J, communicate with passages 5 and 6 extending longitudinally through the nozzle member g and opening into the end of the portion f of the bore d, through which they communicate with a passage 7 in the head B. Seated in the passage 7 is an end of a tube 8 which extends longitudinally through the reservoir E and is provided with a series of coils 9 which may lie adjacent the head C and encircle the pipe H.

Preferably the coils 9 are of only slightly smaller diameter than the interior of the casing D and the portion of the tube 8 forming a continuation of the coil 9 lying immediately adjacent the head C in this instance passes through the coils 9 and through the reservoir E to a point near the head B. The longitudinally extending portions of the tube 8 which extend through apertures 10 in the plate P may be attached thereto, as by brazing or otherwise, so that the entire tube 8, including the coils 9, will be held fixedly in the reservoir E.

In order to assure the introduction of pressure fluid into any of a plurality of portions of the reservoir E, a coil 9, preferably an intermediate coil, is provided with a series of parts 11, four being indicated in this instance. The ports 11 may be equally spaced with respect to each other so that, irrespective of the shifting or turning of the lubricator, at least one port 11 will lie above the surface of the lubricant. Moreover, by arranging the ports 11 in an intermediate coil any oil which may enter the submerged ports will be unable to drain through the tube 8 into the main passageway J through the adjacent or outer coils 9 since, as will be observed, said outer coils are at least of the same diameter as the perforated coil and the oil would therefore be unable to rise to the level required to flow through the unperforated coils.

To the end that any foreign matter, such as dust or grit which may find its way into the reservoir E, may be prevented from entering the main passageway J, a screen 12 is disposed about the periphery of the plate P and suitably secured thereto in such manner that all the lubricant entering the passages T must pass therethrough.

The operation of the device is as follows: Upon the admission of pressure fluid into the supply conduit K, and therefore into the main passageway J, a portion of such pressure fluid will enter either the passage 3 or 4, depending upon the direction of air flow through the passageway J. Such pressure fluid will then flow to the passage 7 and through the tube 8, thence through a port or ports 11 in the perforated coil into the reservoir to exert a pressure on the lubricant therein.

With the needle valve q properly adjusted, the pressure fluid flowing over the ends of the passage k will create a suction at those points and will thus draw oil from the reservoir E through the lowermost passages T into the groove R. Thence the oil will flow through the tube Z, the passage c, the port j and around the needle valve into and through the passages h and k. Upon passing through the opposite ends of the passage k the oil will mingle with the fluid flowing through the main passageway J and be carried thereby into the mechanism intended to be lubricated.

During such operation and, as will be readily apparent, oil will only pass through the immersed inlet openings Y of the passages T. Due to its ability to readily shift its position within the grooves W and S the ring X will then seat upon the inlet openings of the topmost passages T and will prevent the free flow of pressure fluid through these channels into the annular groove R and which would obviously interfere with the drawing of the oil into the submerged passage or passages T.

In practice the present invention has been found to be highly efficient. Constructed in the manner described, the lubricator supplies an adequate amount of lubricant to the mechanism intended to be lubricated and in any of the infinite number of positions which lubricators of this type are required to assume. As will be readily apparent, no matter to what position the lubricator may turn there will always be at least one passage T in communication with the lowermost or approximately the lowermost part of the reservoir E and at the same time one or more of the ports 11 will lie above the surface of the lubricant so that a pressure on the lubricant in the reservoir E equal to that in the passageway J will be assured.

We claim:

1. A lubricator comprising a casing having a lubricant reservoir, a hollow member extending through the casing to form a passageway for pressure fluid, means affixed to the member and having passages to convey lubricant from a plurality of portions of the reservoir, means for conveying such lubricant from the passages to the passageway, means movable by gravity encircling the first said means and being adapted to seat over the inlet openings of certain of the passages and to uncover the inlet openings of other passages, and means disposed fixedly in the reservoir to convey pressure fluid from the passageway to any of a plurality of portions of the reservoir irrespective of the position assumed by the casing.

2. A lubricator comprising a casing having a reservoir for lubricant, a hollow member extending through the casing to form a passageway for pressure fluid, a plate intermediate the ends of the reservoir affixed to the member and having passages opening into the periphery of said plate to convey lubricant from a plurality of outer portions of the reservoir, a ring loosely guided by the plate and encircling the plate to control the inlet openings of the passages, means forming a supply passage for conveying lubricant from the passages to the passageway, a valve to control the flow of lubricant through the supply passage, and a tube disposed fixedly in the casing for conveying pressure fluid from the passageway into the reservoir and comprising a coiled portion lying in one end of the casing and having ports to admit pressure fluid into a plurality of portions of the reservoir.

3. A lubricator comprising a casing having a reservoir for lubricant, a hollow member extending through the casing to form a passageway for pressure fluid, a plate intermediate the ends of the reservoir affixed to the member and having radial passages opening in the periphery of the plate to convey lubricant from a plurality of outer portions of the reservoir, a ring loosely guided by the plate and being adapted to seat over the inlet openings of the upwardly directed passages, means forming a supply passage for conveying lubricant from the passages to the passageway, a valve to control the flow of lubricant through the supply passage, and a tube disposed fixedly in the casing and communicating at one end with the passageway for conveying pressure fluid from the passageway into the reservoir and comprising a series of coils arranged in one end of the casing of which an intermediate coil is provided with ports to admit pressure fluid into a plurality of portions of the reservoir.

EDWARD F. TERRY.
FRED M. SLATER.